US008707073B2

(12) United States Patent
Judd

(10) Patent No.: US 8,707,073 B2
(45) Date of Patent: Apr. 22, 2014

(54) ENERGY-EFFICIENT POLLING LOOP

(75) Inventor: Ian D. Judd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 13/222,525

(22) Filed: Aug. 31, 2011

(65) Prior Publication Data

US 2013/0054989 A1   Feb. 28, 2013

(51) Int. Cl.
*G06F 1/32* (2006.01)

(52) U.S. Cl.
USPC ............ 713/320; 713/300; 713/322; 713/323; 713/324

(58) Field of Classification Search
USPC .......................... 713/300, 320, 322, 323, 324
See application file for complete search history.

(56) References Cited

U.S. PATENT DOCUMENTS

| 6,715,089 | B2 * | 3/2004 | Zdravkovic | ............... 713/322 |
| 6,859,886 | B1 * | 2/2005 | Johnson | ............... 713/600 |
| 7,325,151 | B2 | 1/2008 | Maruichi et al. | |
| 7,774,631 | B1 * | 8/2010 | Walton | ............... 713/321 |
| 7,805,550 | B2 | 9/2010 | Kimelman et al. | |
| 2004/0181700 | A1 | 9/2004 | Katoh et al. | |
| 2008/0219083 | A1 * | 9/2008 | Chang | ............... 365/233.1 |
| 2009/0089562 | A1 | 4/2009 | Schuchman et al. | |
| 2010/0031071 | A1 | 2/2010 | Lu et al. | |

FOREIGN PATENT DOCUMENTS

JP   2010-061644   3/2010

OTHER PUBLICATIONS

U.S. Appl. No. 13/770,300, filed Feb. 2013, Judd, Ian D.*
U.S. Appl. No. 13/770,300, 1 page.
"Energy-Efficient Platforms—Considerations for Application Software and Services", Intel Corporation, http://download.intel.com/technology/pdf/322304.pdf, Revision 2.0, Feb. 2011, pp. 12-16.
"Power Regulator for ProLiant servers", Hewlett-Packard Corporation, http://h20000.www2.hp.com/bc/docs/support/SupportManual/c00300430/c00300430.pdf, Feb. 2011, 13 pages.

* cited by examiner

*Primary Examiner* — Vincent Tran
(74) *Attorney, Agent, or Firm* — Francis Lammes; Stephen J. Walder, Jr.; Randall J. Bluestone

(57) ABSTRACT

Logic is provided for increasing energy-efficiency of a data processing system. First logic continuously checks a plurality of I/O ports for incoming workload. Responsive to the incoming workload being lower than a low workload threshold for a current operating frequency, second logic reduces an operating frequency of the processor. Responsive to the incoming workload being higher than a high workload threshold, the second logic increases the operating frequency of the processor.

12 Claims, 5 Drawing Sheets

ENERGY-EFFICIENT POLLING LOOP

The present application relates generally to an improved data processing apparatus and method and more specifically to mechanisms for an energy-efficient polling loop.

Energy efficiency is becoming increasingly important in data processing systems in order to meet environmental standards. Power consumption is also constrained by many other factors such as cooling and packaging density. As data processing tasks increase in complexity in order to account for energy efficiency, it is becoming more common for data processing systems to include additional software and/or hardware to perform various tasks in order to improve energy efficiency.

Embedded software often includes a user-mode polling loop to check input/output (I/O) ports for incoming work. In this scheme, the polling loop continuously tests each I/O device to determine whether any new requests or responses have arrived; if so, the user-mode application calls an appropriate routine to service the requests or responses. By comparison with interrupts, a polling loop provides higher performance by avoiding context switches to and from the kernel. Such potting loops also provide an easier debug of device drivers if the device drivers are run in user-mode. However, such polling loops always run the central processing unit (CPU) of the data processing system at 100% utilization, even when there is no incoming work, which results in poor energy efficiency.

SUMMARY

In one illustrative embodiment, a method, in a data processing system, is provided for increasing energy-efficiency of a data processing system. The illustrative embodiment continuously checks a plurality of I/O ports for incoming workload. The illustrative embodiment reduces an operating frequency of the processor in response to the incoming workload being lower than a low workload threshold for a current operating frequency. The illustrative embodiment increases the operating frequency of the processor in response to the incoming workload being higher than the high workload threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiment of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Modern central processing units (CPUs) often incorporate power-management facilities. For example, using P-states to dynamically adjust CPU frequency and supply voltage. Multi-core CPUs also provide for deactivating one or more cores when workload is low. These facilities are usually controlled automatically by the operating system and are transparent to applications being executed by the operating system. The illustrative embodiments provide user-mode polling loop and user-mode power management logic that improves the energy efficiency of polling loops in conjunction with current CPU power-management facilities. The user-mode polling loop and user-mode power management logic move the CPU to a lower-power mode when little or no incoming work is detected. Similarly, the user-mode polling loop and user-mode power management logic instruct the CPU to move to a higher-power mode when workload increases above what the current mode can comfortably support.

Figure 1:
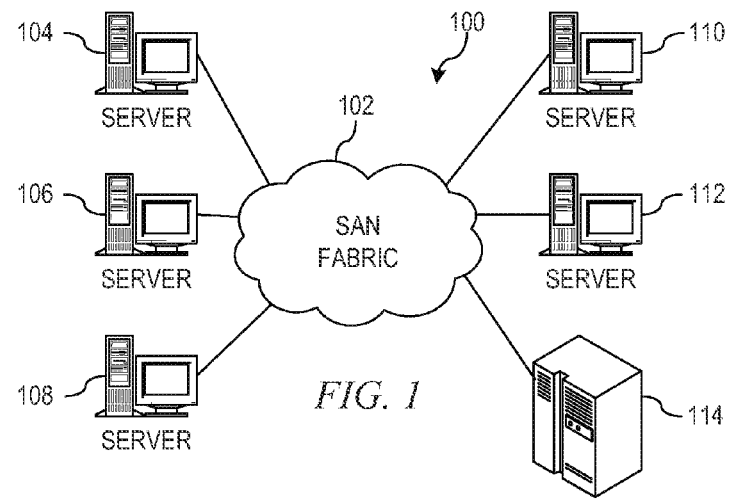
FIG. 1 depicts a pictorial representation of an example distributed data processing system in which aspects of the illustrative embodiments may be implemented.
Figure 2:
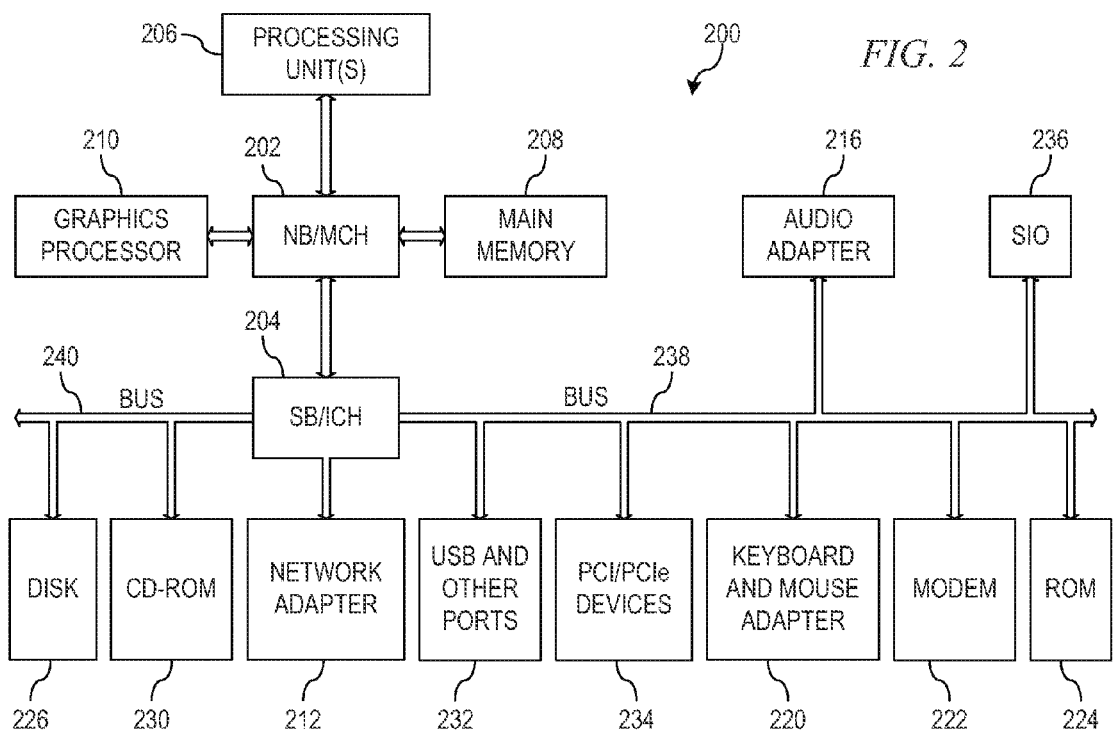
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one storage area network (SAN) fabric 102, which is the medium used to provide communication links between various devices and computers connected together within distributed data processing system 100. The SAN fabric 102 may include connections, such as wire, wireless communication links, fiber optic cables, switches, routers, etc. While distributed data processing system 100 uses SAN fabric 103 as one exemplary medium to provide communication links between various devices and computers connected together within distributed data processing system 100, the present invention is not limited to SAN fabric. That is, the present invention may be applicable to any data processing system with embedded software.

In the depicted example, servers 104, 106, 108, 110, 112 and storage system 114 connect to SAN fabric 102. Servers 104, 106, 108, 110, 112 write data to and read data from external storage systems, such as storage system 114. External storage systems typically include cache to reduce latency. However, in many configurations, several servers may access the same external storage, resulting in contention for resources and cache affinity going to other servers. SAN fabric 102 may be any interconnection, such as Fibre Channel, Fibre Connection (FICON), Serial Attached Small Computer Systems Interconnect (SAS), InfiniBand (IB), Fibre Channel over Convergence Enhanced Ethernet (FCOCEE), Internet Small Computer Systems interconnect (iSCSI), etc.

FIG. 2 is a block diagram of an example data processing system in which aspects of the illustrative embodiments may be implemented. Data processing system 200 is an example of a computer, such as servers 104, 106, 108, 110, or 112 or storage system 114 in FIG. 1, in which computer usable code or instructions implementing the processes for illustrative embodiments of the present invention may be located.

the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. While the depicted example illustrates NB/MCH 202 as being a separate unit from processing unit 206, other data processing system may embed a NB/MCH in the central processing unit. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modern 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not, ROM 224 may be, for example, a flash basic input/output system (BIOS). HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204. While data processing system 200 contains many coupled I/O devices, not all I/O devices are required in all data processing systems. For example, in storage systems, I/O devices, such as graphics processor 210, audio adapter 216, keyboard and mouse adapter 220, or the like may not be necessary to operate the storage system.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
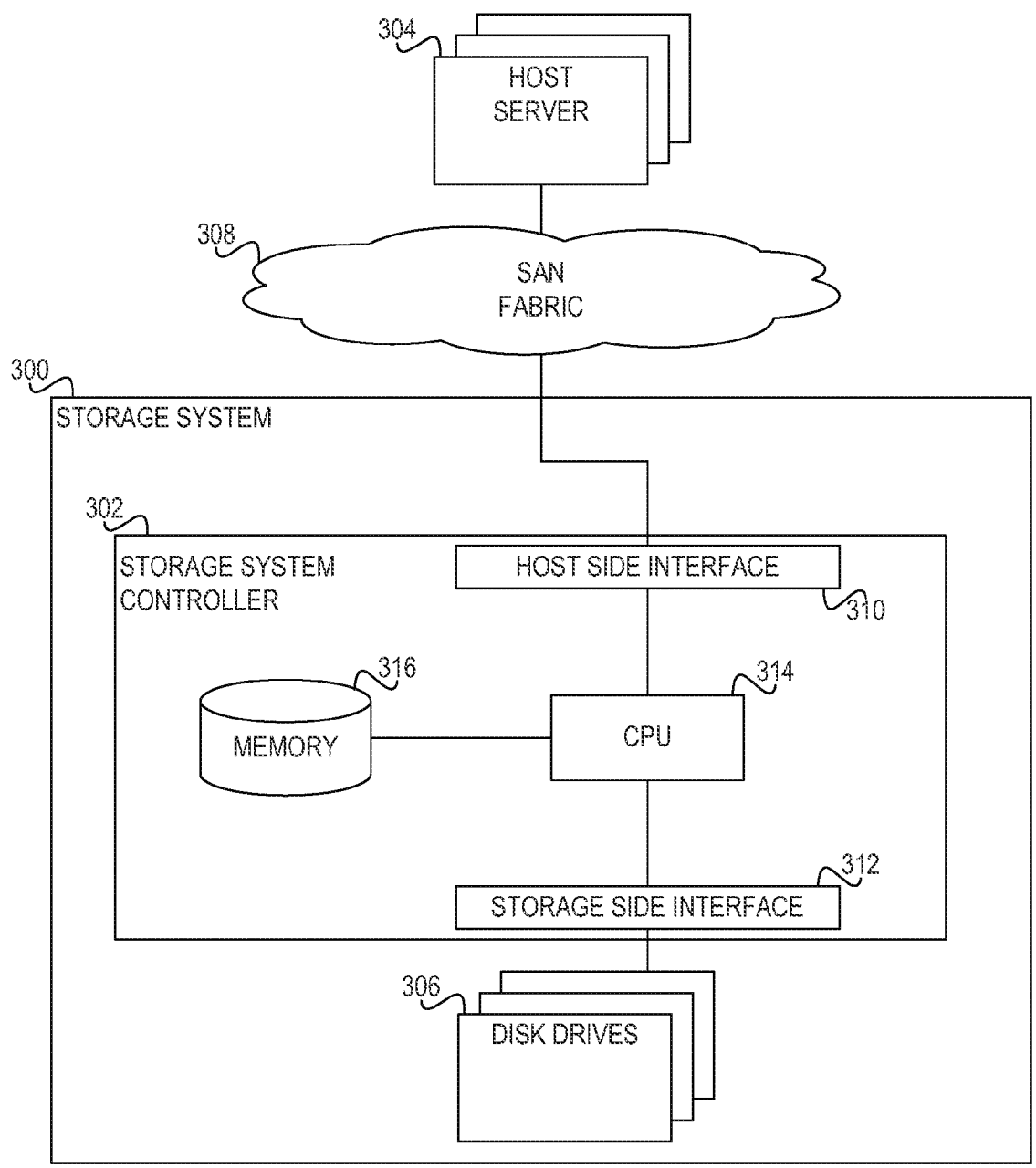
FIG. 3 is an example diagram of a storage system in accordance with one illustrative embodiment.

FIG. 3 is an example diagram of a storage system, such as storage system 114 of FIG. 1, in accordance with one illustrative embodiment. As shown in FIG. 3, the storage system 300 comprises storage system controller 302 coupled to a plurality of host servers 304 and a plurality of disk drives 306. Disk drives 306 may be comprised of high performance storage devices, such as solid state drives (SSDs), and lower performance storage devices, such as hard disk drives (HDDs), coupled to storage system controller 302. Additional sets of storage devices may be provided without departing from the spirit and scope of the illustrative embodiments. Additionally, the storage controller may have a storage cache (not shown) made from fast memory like DRAM that acts as a small but very fast storage tier.

Host servers 304 may be coupled to storage system 300 via SAN fabric 308. Host servers 304 may connect to SAN fabric 308 via a host bus adapter (HBA) where SAN fabric 308 uses a Fibre Channel (FC) protocol, a network interface card (NIC) where SAN fabric 308 uses an Internet SCSI (iSCSI) protocol, a converged network adapter (CNA) where SAN fabric 308 uses Fibre Channel over Ethernet (FCoE) protocol, or the like. Storage system controller 302 may connect to SAN fabric 308 via host side interface 310 and connect to disk drives 306 via storage side interface 312.

Storage system controller 302 receives input/output (I/O) operations targeting storage system 300 from host servers 304, controls the distribution of the I/O operations to the various storage devices in the storage system 300, monitors the accesses and responses to and from the storage devices, handles exception conditions like failed configures and initializes the various devices, and generally orchestrates the operation of storage system 300.

Central processing unit (CPU) 314 receives reads and writes from host servers 304 through host side interface 310 and reads and/or writes to disk drives 306 through storage side interface 312 using protocols such as Fibre Channel Arbitrated Loop, Serial Attached Small Computer Systems Interconnect (SAS), or the like.

At a high level, CPU 314 executes user-mode polling loop logic which continuously checks I/O ports, such as host side interface 310 and storage side interface 312, for incoming, workload and then CPU 314 processes the workload. When the incoming workload is lower than a low workload threshold for a current operating frequency, user-mode power management logic may reduce the operating frequency of CPU 314. The user-mode power management logic may also increase the operating frequency of CPU 314 when the incoming workload is higher than a high workload threshold for a current operating frequency. Both the user-mode polling loop logic and the user-mode power management logic run as a user-mode program as opposed to current systems where power management is performed by an operating system, which does not operate when polling loop logic is executed as a user-mode program. One exemplary implementation of adjusting the operating frequency of CPU 314 may be using a 'userspace governor' in Linux which allows a user-mode application to query and set the operating frequency of a CPU by reading and writing files in a/sys directory. However, one of ordinary skill in the art would recognize that other implementations for adjusting an operating frequency of a CPU may be made without departing from the spirit and scope of the invention.

In detail, during normal operation of storage system controller 302, CPU 314 may execute user-mode polling loop logic. In execution of the user-mode polling loop logic, CPU 314 will poll host side interface 310 to determine whether there is an I/O request pending from one or more of host servers 304. If there is an I/O request pending from one or more of host servers 304, then CPU 314 processes the I/O request by directing the I/O request to an appropriate one or more of disk drives 306. If there is not an I/O request pending from one or more of host servers 304, then CPU 314 determines whether there is an I/O response pending from one or more of disk drives 306. If there is an I/O response pending from one or more of disk drives 306, then CPU 314 processes the I/O response by directing the I/O response to an appropriate one or more of host servers 304. If there is not an I/O response pending from one or more of disk drives 306, the CPU then continues to determine whether there is another I/O request pending from one or more of host servers 304 or another I/O response pending from one or more of disk drives 306.

In accordance with the illustrative embodiments and in order to reduce the power consumption associated with executing the user-mode polling loop logic, (prior to determining whether an I/O request is pending from one or more of host servers 304 or an I/O response is pending from one or more of disk drives 306, CPU 314 sets a busy flag (B) to 0. CPU 314 uses the busy flag (B), which is a shared variable, to determine the I/O workload of storage system controller 302 as will be described in detail below. With the busy flag (B) set to 0, CPU 314 polls host side interface 310 to determine whether there is an I/O request pending from one or more of host servers 304. If there is an I/O request pending from one or more of host servers 304, then CPU 314 sets the busy flag (B) to 1 and then processes the I/O request by directing the I/O request to an appropriate one or more of disk drives 306. If there is not an I/O request pending from one or more of host servers 304, then CPU 314 polls storage side interface 312 to determine whether there is an I/O response pending from one or more of disk drives 306. If there is an I/O response pending from one or more of disk drives 306, then CPU 314 sets the busy flag (B) to 1 and processes the I/O response by directing the I/O response to an appropriate one or more of host servers 304. If there is not an I/O response pending from one or more of disk drives 306, the CPU then continues to determine whether there is another I/O request pending from one or more of host servers 304 or another I/O response pending from one or more of disk drives 306.

In conjunction with processing I/O requests and I/O responses, CPU 314 also executes user-mode power management logic based on the polling by the user-mode polling loop logic. Initially, CPU 314 initializes a count of consecutive cycles (D) that indicates when the I/O workload is below a low threshold CO, initializes a count of a loop counter for the number of samples (N) taken during a current cycle, and initializes a count of samples (U) that indicates when the busy flag (B) from the user-mode polling loop logic is set to 1. After initialization of the count of consecutive cycles (D), the count for the total number of samples (N), and the count of samples (U), CPU 314 samples the value of the busy flag (B) at interval (T). After the sampling of the busy flag (B), CPU 314 determines whether the busy flag (B) is equal to 1. If the value of busy flag (B) is equal to 1, CPU 314 increments the count of samples (U) by 1. If the value of busy flag (B) is not equal to 1 or after CPU 314 increments the count of samples (U) by 1, CPU 314 increments the count for the total number of samples (N) by 1.

CPU 314 then determines whether the current value of the count for the number of samples (N) is greater than a total number of samples (M) for a given cycle of the user-mode power management logic. If the count for the number of samples (N) is less than or equal to the total number of samples (M), then CPU 314 waits for another sampling of the value of the busy flag (B) from the user-mode polling loop logic at interval (T). If the count for the number of samples (N) is greater than the total number of samples (M), then CPU 314 determines whether a current value of the count of samples (U) is less than the low threshold (L).

If the current value of the count of samples (U) is greater than or equal to the low threshold (L), then CPU 314 determines whether the current value of the count of samples (U) is greater than a high threshold (H). If the current value of the count of samples (U) is less than or equal to the high threshold (H), then CPU 314 takes no action with regard to the current operating frequency of the CPU. However, if the current value of the count of samples (U) is greater than the high threshold (H), CPU 314 takes action to increase its operating frequency in order to handle the increased workload. Whether or not CPU 314 adjusted its operating frequency, CPU 314 starts a new cycle of the user-mode power management logic by reinitializing the count of consecutive cycles (D), the count for the total number of samples (N), and the count of samples (U).

If the current value of the count of samples (U) is less than the low threshold (L), then CPU 314 increments the count of consecutive cycles (D) by 1 and then determines whether the current value of the count of consecutive cycles (D) is greater than or equal to than a threshold for number of cycles with low I/O work load (P) before the frequency is decreased by 1 step. That is, in accordance with the illustrative embodiments, decreases in frequency are performed at a slower rate than increases in frequency. For example, if the threshold for number of cycles with low I/O work load (P) were set to 5, then the frequency decreases five time (5×) slower than the frequency increases. If CPU 314 determines that the current value of the count of consecutive cycles (D) is less than the threshold for number of cycles with low work load (P), then CPU 314 restarts the given cycle of the user-mode power management logic but only reinitializes the count for the total number of samples (N) and the count of samples (U). If the current value of the count of consecutive cycles (D) is greater than or equal to a threshold for number of cycles with low I/O work load (P), then CPU 314 takes action to decrease its operating frequency in order to reduce power consumption. CPU 314 then starts a new cycle of the user-mode power management logic by reinitializing the count of consecutive cycles (D), the count for the total number of samples (N), and the count of samples (U). The various counters and thresholds may be stored in hardware registers within storage system controller 302 or as data values within memory 316.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "mechanism," "circuit," "module," "logic," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
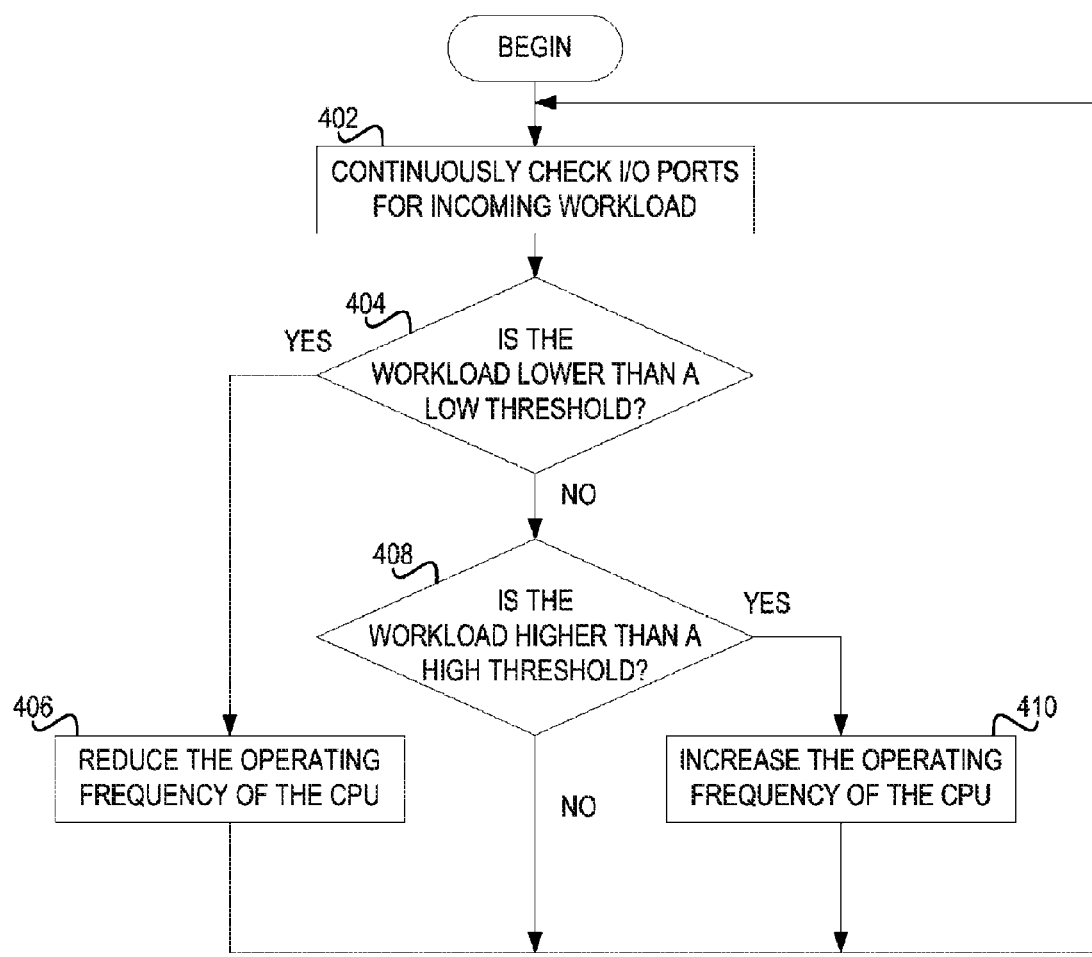
FIG. 4 depicts a high-level flowchart of the operation performed for increasing energy-efficiency of a data processing system in accordance with an illustrative embodiment.

FIG. 4 depicts a high-level flowchart of the operation performed for increasing energy-efficiency of a data processing system in accordance with an illustrative embodiment. As the operation begins, user-mode polling loop logic, executed by a CPU, continuously checks I/O ports for incoming workload (step 402). User-mode power management logic determines whether the workload is lower than a low workload threshold (step 404). If at step 404 the workload is lower than a low workload threshold, the user-mode power management logic reduces the operating frequency of the CPU (step 406), with the operation returning to step 402 thereafter. If at step 404 the workload is higher than the low workload threshold, the user-mode power management logic determines whether the workload is higher than a high workload threshold (step 408). If at step 408 the workload is higher than the high workload threshold, the user-mode power management logic increases the operating frequency of the CPU (step 410), with the operation returning to step 402 thereafter. If at step 408 the workload is lower than the high workload threshold, the operation returns to step 402.

Figure 5:
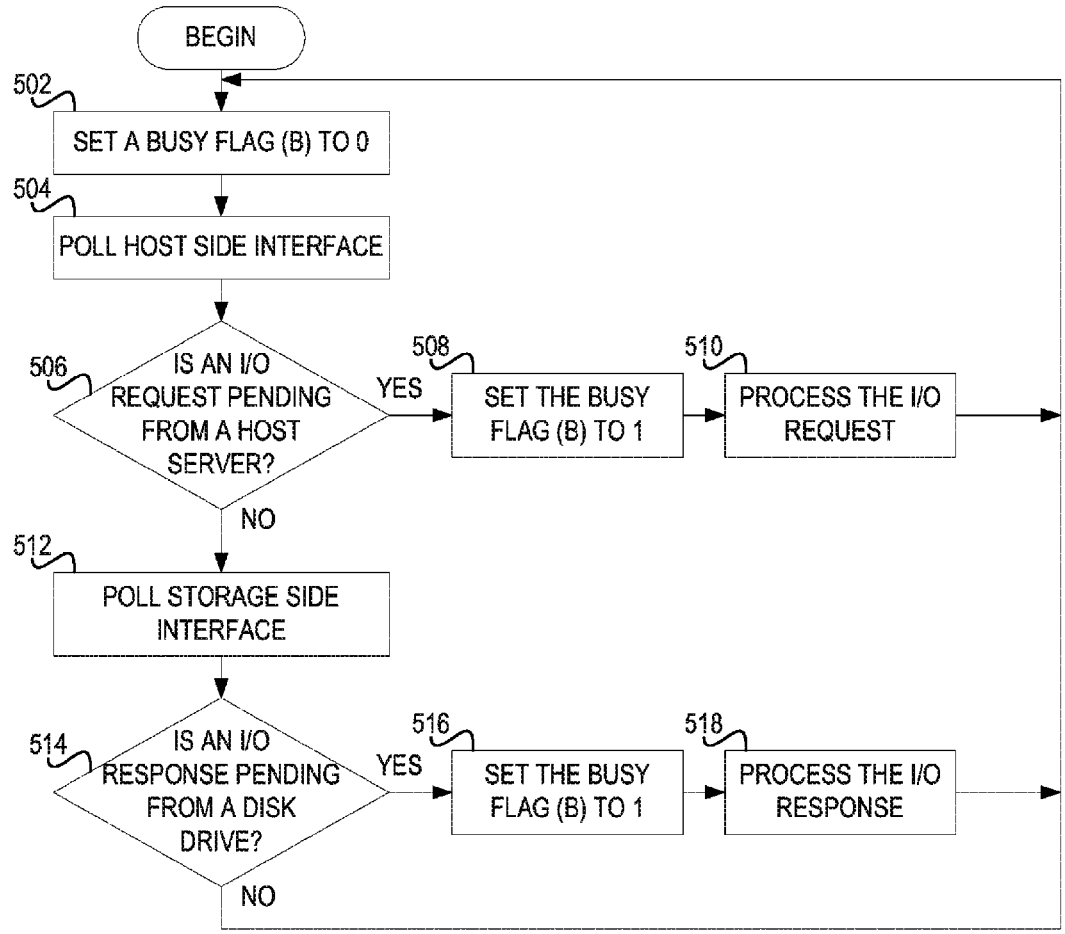
FIG. 5 depicts a flowchart of the operation performed in execution of user-mode polling loop logic in accordance with an illustrative embodiment.

FIG. 5 depicts a flowchart of the operation performed in execution of user-mode polling loop logic in accordance with an illustrative embodiment. As the operation begins, the user-mode polling loop logic, executed by a CPU, sets a busy flag (B) to 0 (step 502). The user-mode polling loop logic then polls a host side interface (step 504) to determine whether there is an I/O request pending from a host server (step 506). If at step 506 there is an I/O request pending from a host server, then the user-mode polling loop logic sets the busy flag (B) to 1 (step 508) and then processes the I/O request by directing the I/O request to an appropriate disk drive (step 510), with the operation returning to step 502 thereafter.

If at step 506 there is not an I/O request pending from a host server, then the user-mode polling loop logic polls a storage side interface (step 512) to determine whether there is an I/O response pending from a disk drive (step 514). If at step 514 there is an I/O response pending from a disk drive, then the user-mode polling loop logic sets the busy flag (B) to 1 (step 516) and processes the I/O response by directing the I/O response to an appropriate host server (step 518), with the operation returning to step 502 thereafter. If at step 514 there is not an I/O response pending from a disk drive, the operation returns to step 502.

Figure 6:
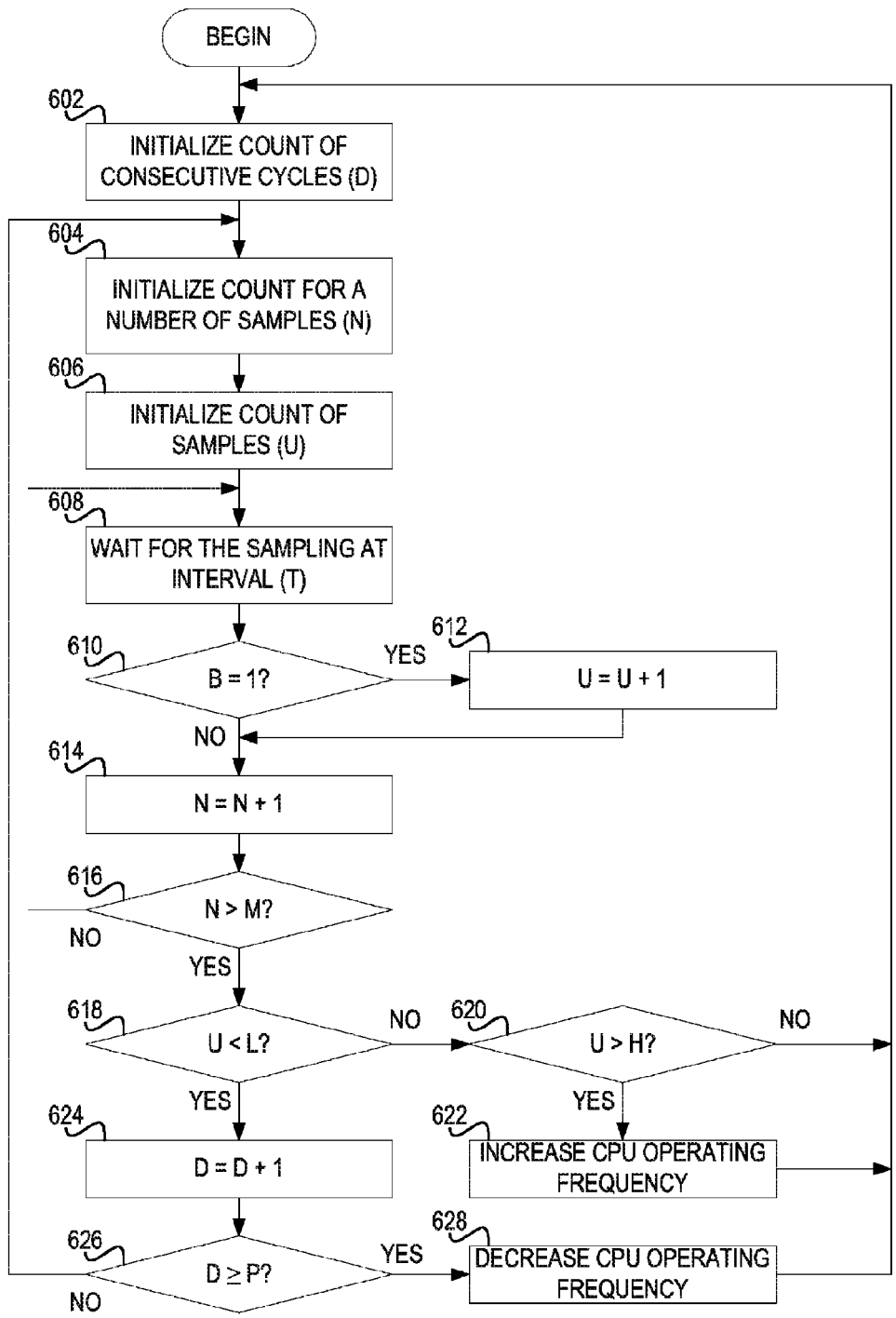
FIG. 6 depicts a flowchart of the operation performed in execution of user-mode power management logic in accordance with an illustrative embodiment.

FIG. 6 depicts a flowchart of the operation performed in execution of user-mode power management logic in accordance with an illustrative embodiment. As the operation begins, the user-mode power management logic, executed by the CPU, initializes a count of consecutive cycles (D) that indicates when the I/O workload is below a low threshold (L) (step 602), initializes a loop counter for the total number of samples (N) taken during a current cycle (step 604), and initializes a count of samples (U) that indicates when the busy flag (B) from the user-mode polling loop logic is set to 1 (step 606). After initialization of the count of consecutive cycles (D), the count for the total number of samples (N), and the count of samples (U), the user-mode power management logic waits for the sampling of the value of the busy flag (B) from the user-mode polling loop logic at interval (T) (step 608). After the sampling of the busy flag (B), the user-mode power management logic determines whether the value of the busy flag (B) is equal to 1 (step 610). If at step 610 the value of busy flag (B) is equal to 1, the user-mode power management logic increments the count of samples (U) by 1 (step 612). If at step 610 the value of busy flag (B) is not equal to 1 or from step 612, the user-mode power management logic increments the count for the total number of samples (N) by 1 (step 614).

The user-mode power management logic then determines whether the current value of the count for the number of samples (N) is greater than a total number of samples (M) for a given cycle of the user-mode power management logic (step 616). If at step 616 the current value of the count for the number of samples (N) is less than or equal to the total number of samples (M), then the operation returns to step 608 to wait for another sampling of the value of the busy flag (B) from the user-mode polling loop logic at interval (T). If at step 616 the current value of the count for the number of samples (N) is greater than the total number of samples (M), then the user-mode power management logic determines whether a current value of the count of samples (U) is less than the low threshold (L) (step 618).

If at step 618 the current value of the count of samples (U) is greater than or equal to the low threshold (L), then the user-mode power management logic determines whether the current value of the count of samples (U) is greater than a high threshold (H) (step 620). If at step 620 the current value of the count of samples (U) is less than or equal to the high threshold (H), then the user-mode power management logic takes no action with regard to the current operating frequency of the CPU and the operation returns to step 602. However, if at step 620 the current value of the count of samples (U) is greater than the high threshold (H), the user-mode power management logic takes action to increase its operating frequency in order to handle the increased workload (step 622), with the operation returning to step 602 thereafter.

If at step 618 the current value of the count of samples (U) is less than the low threshold (L), then the user-mode power management logic increments the count of consecutive cycles (D) by 1 (step 624). The user-mode power management logic then determines whether the current value of the count of consecutive cycles (D) is greater than or equal to a threshold for number of cycles with low I/O work load (P) before the operating frequency is decreased by 1 step (step 626). That is, in accordance with the illustrative embodiments, decreases in frequency are performed at a slower rate than increases in frequency. If at step 626 the current value of the count of consecutive cycles (D) is less than the threshold for number of cycles with low I/O work load (P), then the operation returns to step 604. If at step 626 the current value of the count of consecutive cycles (D) is greater than or equal to than a threshold for number of cycles with low I/O work load (P), then the user-mode power management logic takes action to decrease its operating frequency in order to reduce power consumption (step 628), with the operation returning to step 602 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for improving the energy efficiency of polling loops in conjunction with current CPU power-management facilities. The polling loop and power management logic move the CPU to a lower-power mode when little or no incoming work is detected. Similarly, the polling loop and power management logic instruct the CPU to move to a higher-power mode when workload increases above what the current mode can comfortably support.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable user-mode program, when executed on a computing device, causes the computing device to:
   continuously check a plurality of I/O ports for incoming workload, wherein checking the plurality of I/O ports for the incoming workload comprises:
      during a predetermined power management cycle, receive a sample indicating a value of a busy flag (B) at predetermined intervals (T);
      for a current predetermined interval (T), responsive to a value of the busy flag (B) failing to be equal to a first value, increment a count for a number of samples (N); and
      responsive to a current value of the count for the number of samples (N) being greater than a total number of samples (M), determine whether a current value of a count of samples (U) is less than a low workload threshold (L);
   responsive to the current value of the count of sample (U) being lower than the low workload threshold (L) for a current operating frequency, decrease an operating frequency of the processor; and
   responsive to the current value of the count of samples (U) being higher than a high workload threshold (H), increase the operating frequency of the processor.

2. The computer program product of claim 1, wherein the computer readable program to decrease the operating frequency of the processor further causes the computing device to:
   increment a count of consecutive cycles (D) by a second value;
   determine whether a current value of the count of consecutive cycles (D) is greater than or equal to a threshold for number of cycles with low I/O workload (P) before the operating frequency of the processor is decreased; and
   responsive to the current value of the count of consecutive cycles (D) being greater than or equal to the threshold for number of cycles with low I/O workload (P), decrease the operating frequency of the processor in order to reduce power consumption and increase energy efficiency.

3. The computer program product of claim 2, wherein the computer readable program further causes the computing device to:
   responsive to the current value of the count of consecutive cycles (D) being less than the threshold for number of cycles with low I/O workload (F), re-initialize the count for the number of samples (N);
   re-initialize the count of samples (U); and
   wait for another sample of the value of the busy flag (B) at a next predetermined interval (T).

4. The computer program product of claim 1, wherein the computer readable program further causes the computing device to:
   responsive to a value of the busy flag (B) being equal to the first value, increment the count of samples (U) by a second value prior to incrementing a count for the number of samples (N).

5. The computer program product of claim 1, wherein the computer readable program further causes the computing device to:
   responsive to the current value of the count for the number of samples (N) being less than or equal to the total number of samples (M), wait for another sample of the value of the busy flag (B) at a next predetermined interval (T).

6. The computer program product of claim 1, wherein the computer readable program further causes the computing device to:
   responsive to the current value of the count of samples (U) being greater than or equal to the low workload threshold (L), determine whether the current value of the count of samples (U) is greater than a high workload threshold (H); and
   responsive to the current value of the count of samples (U) being less than or equal to the high workload threshold (H), leave the operating frequency of the processor at a current setting.

7. An apparatus, comprising:
   a processor; and a memory coupled to the processor, wherein the memory comprises instructions in a user-mode program which, when executed by the processor, cause the processor to:

continuously check a plurality of I/O ports for incoming workload, wherein checking the plurality of I/O ports for the incoming workload comprises:

during a predetermined power management cycle, receive a sample indicating a value of a busy flag (B) at predetermined intervals (T);

for a current predetermined interval (T), responsive to a value of the busy flag (B) failing to be equal to a first value, increment a count for a number of samples (N); and responsive to a current value the count for the number of samples (N) being greater than a total number of samples (M), determine whether a current value of a count of samples (U) is less than a low workload threshold (L);

responsive to the current value of the count of samples (U being lower than the low workload threshold (L) for a current operating frequency, decrease an operating frequency of the processor; and responsive to the current value of the count of samples (U) being higher than a high workload threshold (H), increase the operating frequency of the processor.

8. The apparatus of claim 7, wherein the instructions to decrease the operating frequency of the processor further cause the processor to:

increment a count of consecutive cycles (D) by a second value;

determine whether a current value of the count of consecutive cycles (D) is greater than or equal to a threshold for number of cycles with low I/O workload (P) before the operating frequency of the processor is decreased; and responsive to the current value of the count of consecutive cycles (D) being greater than or equal to the threshold for number of cycles with low I/O workload (P), decrease the operating frequency of the processor in order to reduce power consumption and increase energy efficiency.

9. The apparatus of claim 8, wherein the memory comprises instructions which, when executed by the processor, cause the processor to:

responsive to the current value of the count of consecutive cycles (D) being less than the threshold for number of cycles with low I/O workload (P), re-initialize the count for the number of samples (N);

re-initialize the count of samples (U); and wait for another sample of the value of the busy flag (B) at a next predetermined interval (T).

10. The apparatus of claim 7, wherein the instructions further cause the processor to:

responsive to a value of the busy flag (B) being equal to the first value, increment the count of samples (U) by a second value prior to incrementing a count for the number of samples (N).

11. The apparatus of claim 7, wherein the instructions further cause the processor to:

responsive to the current value of the count for the number of samples (N) being less than or equal to the total number of samples (M), wait for another sample of the value of the busy flag (B) at a next predetermined interval (T).

12. The apparatus of claim 7, wherein the instructions further cause the processor to:

responsive to the current value of the count of samples (U) being greater than or equal to the low workload threshold (L), determine whether the current value of the count of samples (U) is greater than a high workload threshold (H); and responsive to the current value of the count of samples (U) being less than or equal to the high workload threshold (H), leave the operating frequency of the processor at a current setting.

* * * * *